US006591552B1

(12) United States Patent
Rasmussen

(10) Patent No.: US 6,591,552 B1
(45) Date of Patent: Jul. 15, 2003

(54) POWER SLIDER WINDOW ASSEMBLY

(75) Inventor: Doug Rasmussen, West Bloomfield, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/638,433

(22) Filed: Aug. 14, 2000

(51) Int. Cl.$^7$ ............................................... E05D 15/06
(52) U.S. Cl. ......................................... 49/413; 49/121
(58) Field of Search ......................... 49/360, 121, 413

(56) References Cited

U.S. PATENT DOCUMENTS

| | | | | |
|---|---|---|---|---|
| 4,124,054 A | | 11/1978 | Spretnjak ..................... 160/90 |
| 4,158,270 A | | 6/1979 | Cherbourg et al. ........... 49/103 |
| 4,635,398 A | | 1/1987 | Nakamura .................... 49/413 |
| 4,785,583 A | | 11/1988 | Kawagoe et al. ............. 49/404 |
| 4,920,698 A | | 5/1990 | Friese et al. .................. 49/380 |
| 4,995,195 A | | 2/1991 | Olberding et al. ............ 49/118 |
| 5,146,712 A | * | 9/1992 | Hlavaty ........................ 49/118 |
| 5,345,717 A | | 9/1994 | Mori et al. .................... 49/404 |
| 5,442,880 A | | 8/1995 | Gipson ......................... 49/413 |
| 5,473,840 A | | 12/1995 | Gillen et al. .................. 49/380 |
| 5,505,023 A | | 4/1996 | Gillen et al. .................. 49/380 |
| 5,531,046 A | * | 7/1996 | Kollar et al. ................. 49/360 |
| 5,542,214 A | | 8/1996 | Buening ....................... 49/380 |
| 5,613,323 A | | 3/1997 | Buening ....................... 49/380 |
| 5,724,769 A | | 3/1998 | Cripe et al. ................... 49/360 |
| 5,784,833 A | | 7/1998 | Sponable et al. ............. 49/360 |
| 5,822,922 A | * | 10/1998 | Grumm et al. ............... 49/360 |
| 5,953,887 A | | 9/1999 | Lucas et al. .................. 53/534 |
| 5,996,284 A | | 12/1999 | Freimark et al. ............. 49/209 |
| 6,014,840 A | * | 1/2000 | Ray et al. ..................... 49/413 |
| 6,025,611 A | | 2/2000 | Ralston et al. ................ 49/123 |
| 6,112,462 A | | 9/2000 | Kolar ........................... 49/121 |
| 6,119,401 A | * | 9/2000 | Lin et al. ...................... 49/361 |
| 6,119,402 A | | 9/2000 | Wisner ......................... 49/362 |
| 6,125,585 A | * | 10/2000 | Koneval ....................... 49/349 |
| 6,324,788 B1 | * | 12/2001 | Koneval et al. .............. 49/121 |

FOREIGN PATENT DOCUMENTS

FR    1199868    12/1959

* cited by examiner

Primary Examiner—Daniel P. Stodola
(74) Attorney, Agent, or Firm—Van Dyke, Gardner, Linn & Burkhart, LLP

(57) ABSTRACT

A vehicular sliding window assembly includes first and second spaced apart fixed window panes and a polymeric member provided on perimeter portions of the fixed window panes. The polymeric member forms a gasket and includes at least one guide track molded in the polymeric member. At least one sliding window pane is positioned in the guide track and is positionable between a closed position and at least one open position. The window assembly further includes a support rail, which supports the sliding window pane above a lower surface of the lower guide track whereby the weight of the sliding window pane is borne by the support rail and not the lower guide track to reduce the friction between the guide track and the sliding window pane to provide a smooth sliding action when the sliding window pane is moved along the guide track between its closed and open positions.

58 Claims, 10 Drawing Sheets

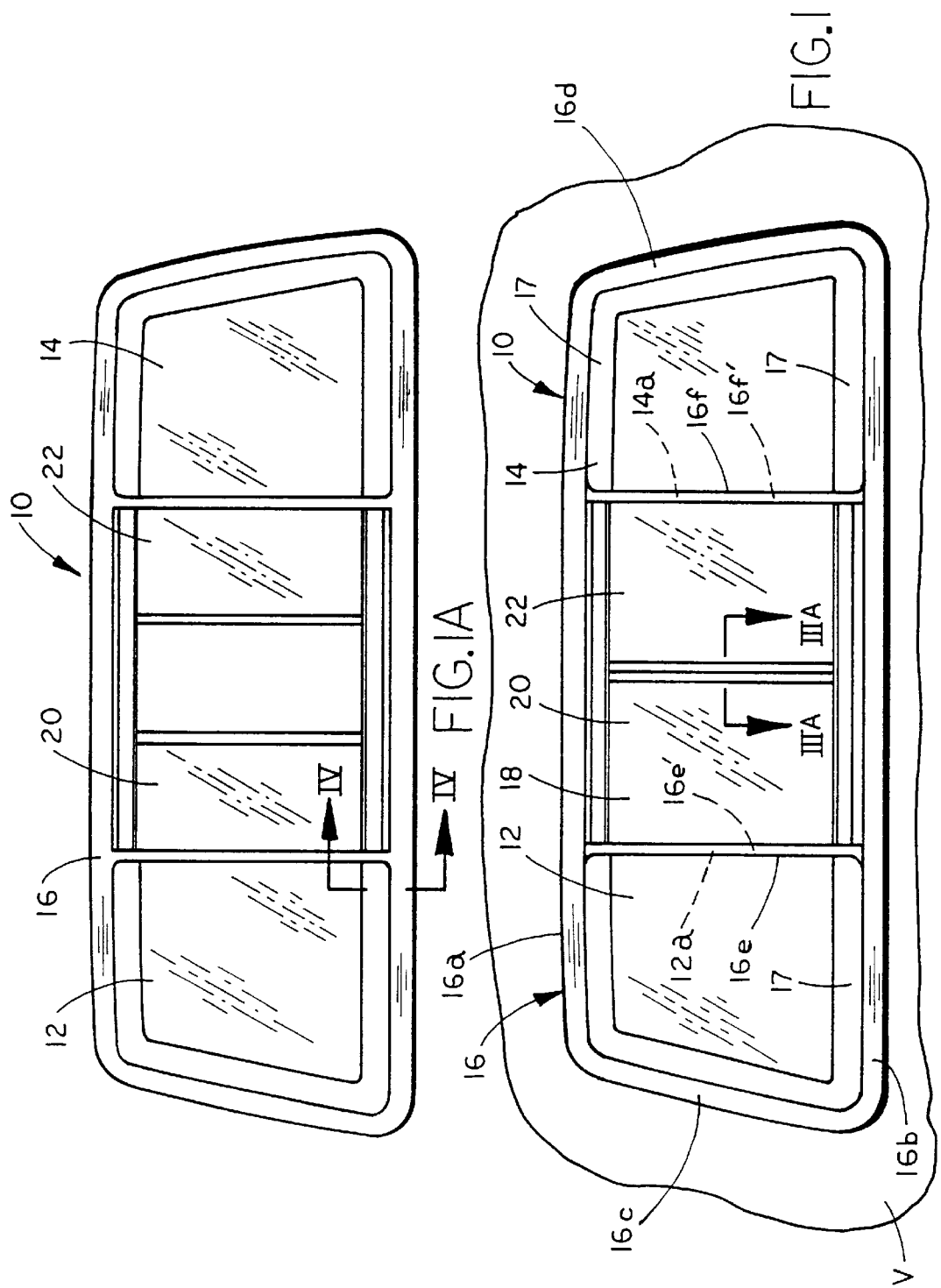

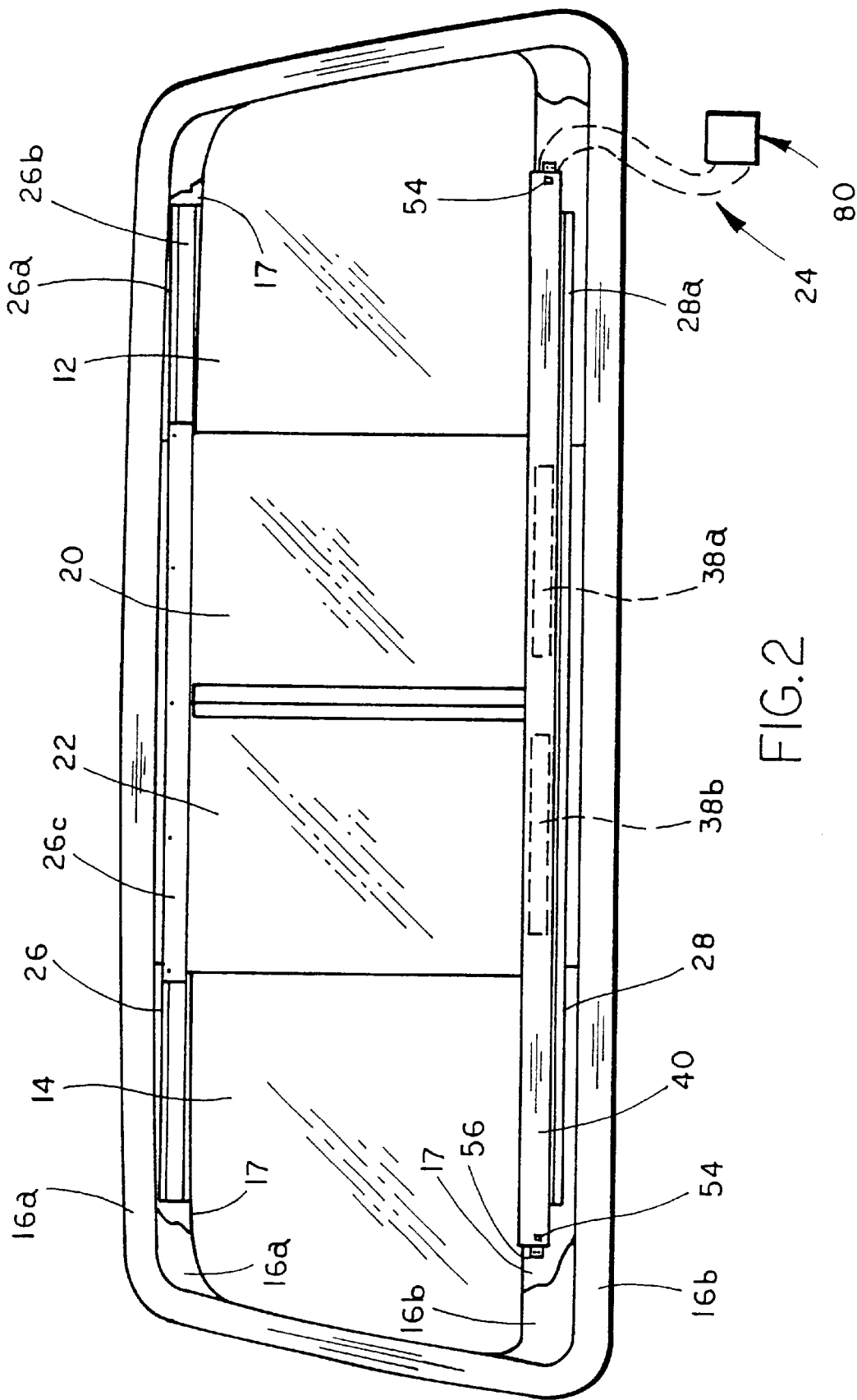

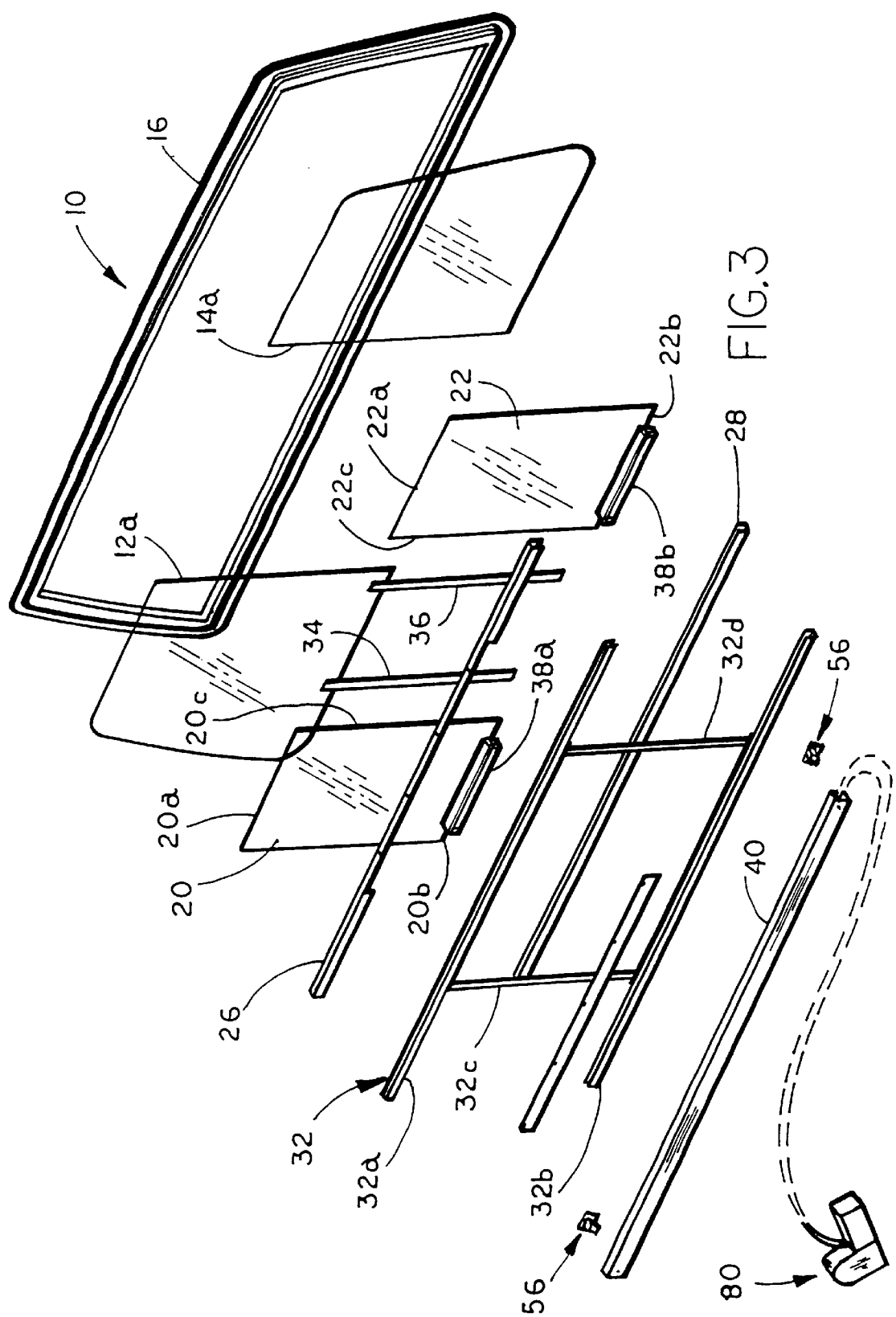

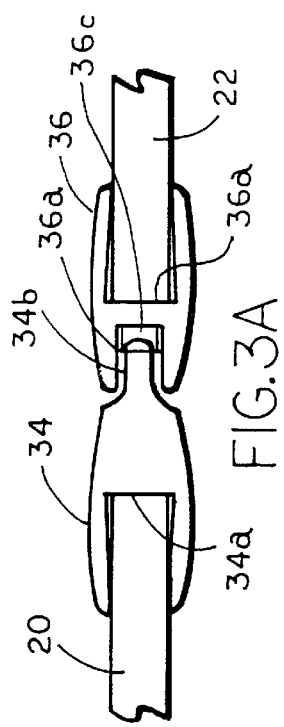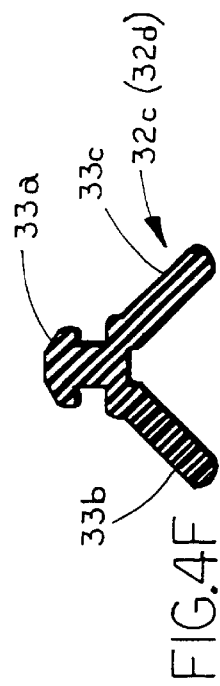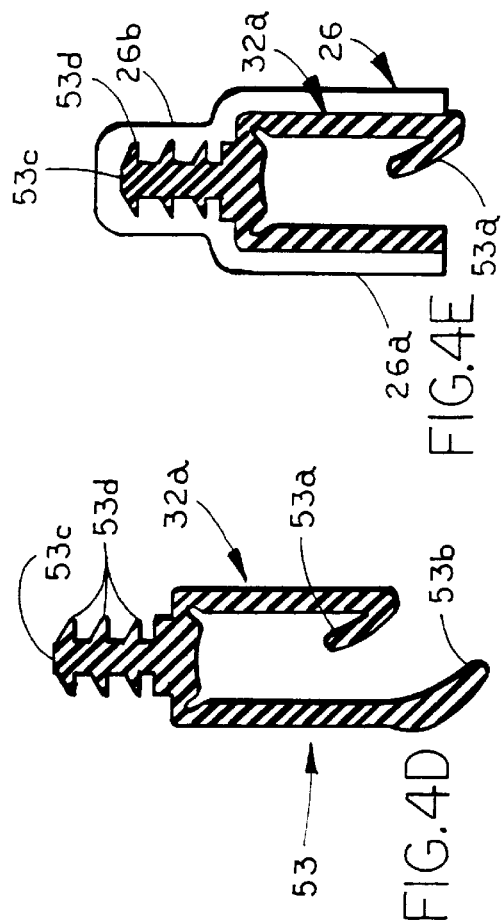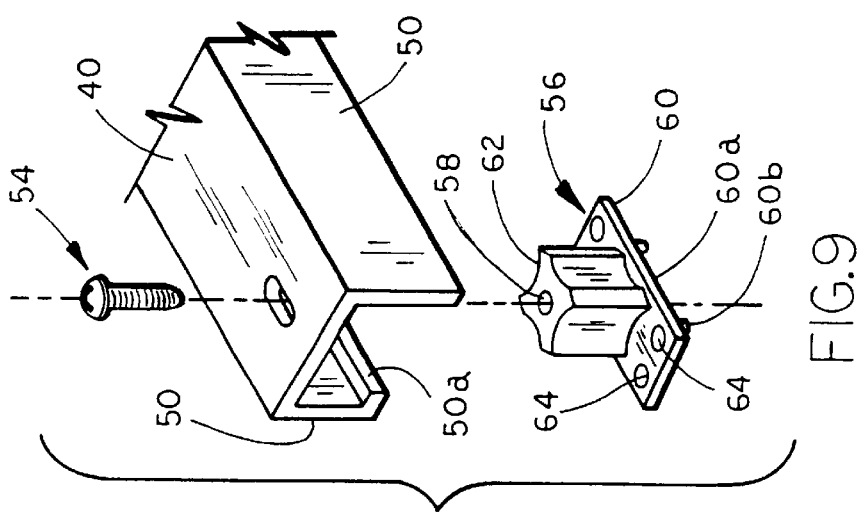

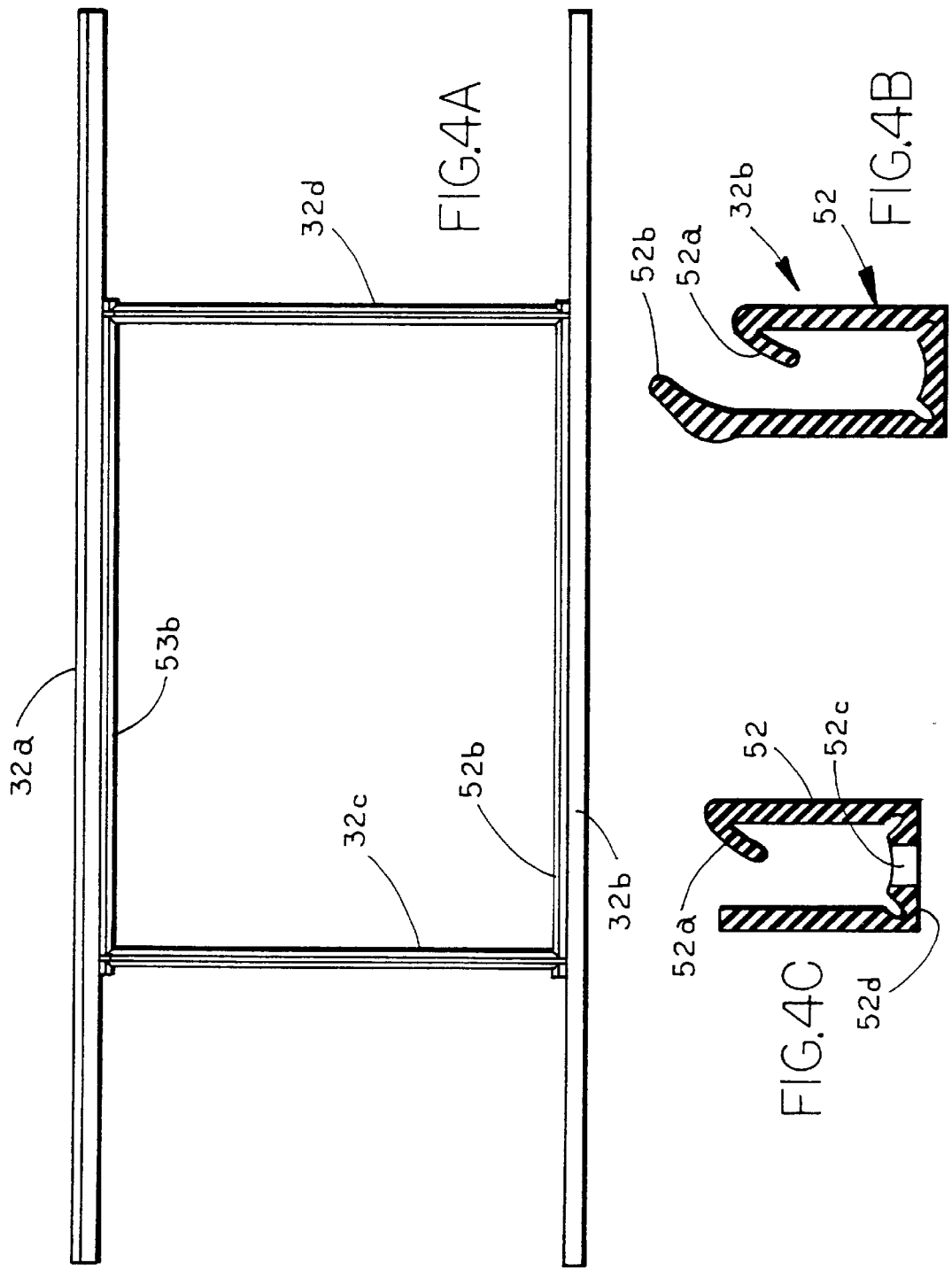

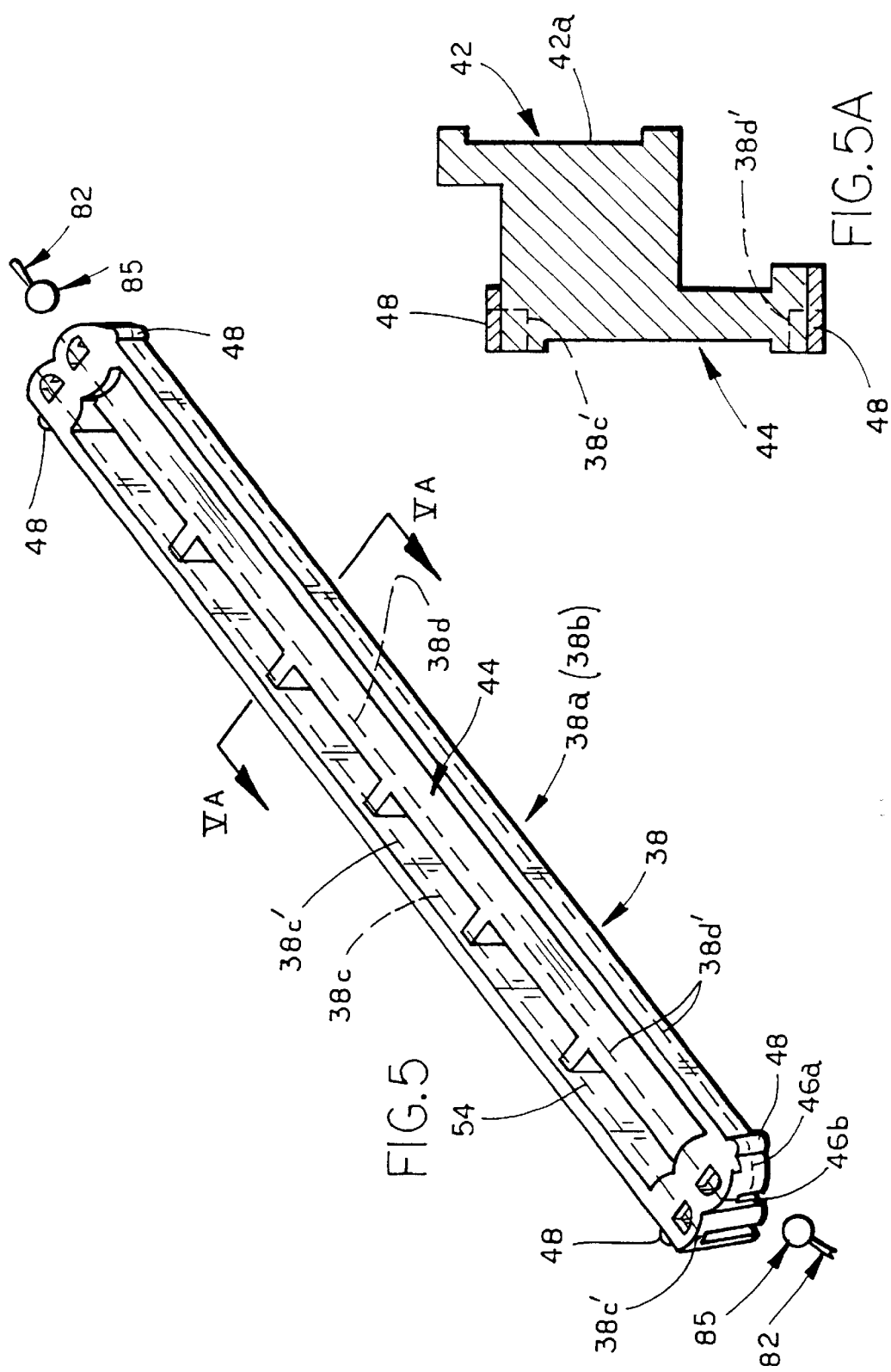

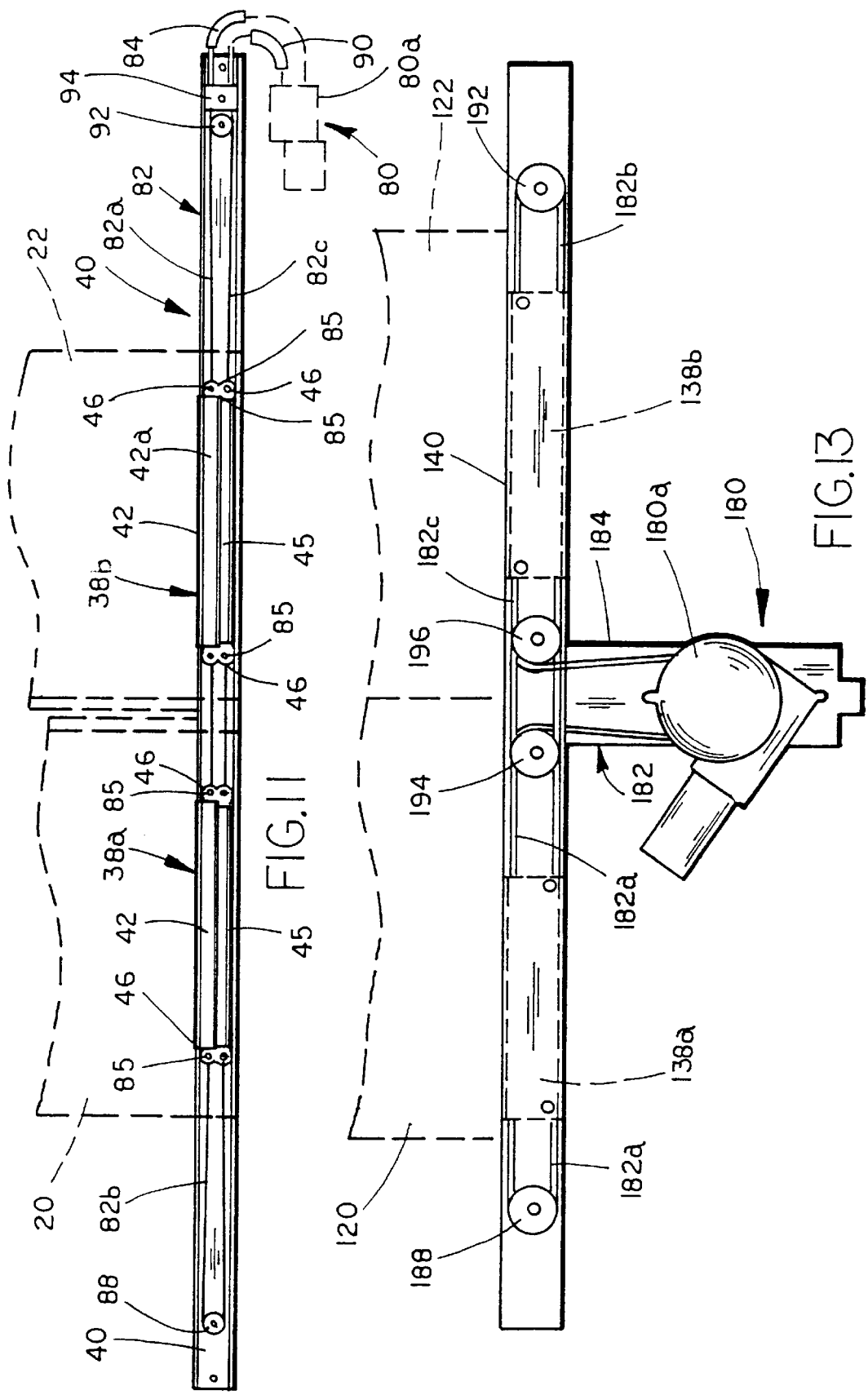

POWER SLIDER WINDOW ASSEMBLY

TECHNICAL FIELD AND BACKGROUND OF THE INVENTION

The present invention relates to a window assembly and, more particularly, to a modular sliding window assembly for vehicles.

Sliding window assemblies are often used, for example, in a rear cab opening of a truck. Typically, such sliding window assemblies include a frame with one or more fixed panes and one or more sliding panes which are either manually operated or operated using electro-mechanical systems.

The trend in vehicle windows is to form a pre-assembled modular window assembly which can be installed as a single component. In addition, more recently, modular window assemblies are preferably flush mounted, with the window assembly retained by studs or clips that are molded or otherwise attached to the gasket. As a result, the gasket not only provides a seal for the window assembly but now integrates the window pane or panes to form a structural self-contained, pre-assembled unit that is easier to handle during shipping and installation.

In sliding window assemblies, flush mounting has posed several problems. Because the electro-mechanical systems used to move the sliding window panes typically entail complicated drive arrangements and often require large motors to move the sliding panes, these arrangements add significant weight to the window assembly. Furthermore, these drive arrangements often consume a significant amount of space. Therefore, for these and various other reasons, these various drive mechanisms have not heretofore been successfully integrated into flush-mounted modular window assemblies.

Another problem with some of the conventional sliding window designs is that the weight of the sliding window panes creates significant friction between the sliding panes and the tracks which are used to support the panes. This increases the power requirement for the drive mechanism and, hence, the size of the motor. In addition, the increased friction can result in binding or chattering of the sliding panes which can damage the drive assembly.

Consequently, there is a need for a modular sliding window assembly which can be flush mounted within a vehicle while incorporating a drive mechanism that permits one or more sliding panes of the window assembly to be selectively moved between open and closed positions. In addition, there is a need for a sliding modular window assembly which provides a smooth sliding action of the sliding window panes, which reduces the power requirements of the drive mechanism.

SUMMARY OF THE INVENTION

Accordingly, a vehicular sliding window assembly of the present invention provides a modular assembly which can be installed in a vehicle, such as a rear cab opening, as a single unit. The window assembly includes one or more sliding window panes which move between open and closed positions. The sliding window panes are preferably driven by a drive assembly which needs only a low power motor to move the respective sliding window panes. At least a portion of the drive assembly is self-contained and supported in a support rail which is mounted to a polymeric member formed around perimeter portions of the fixed window panes. In this manner, the window assembly can be pre-assembled with the drive assembly prior to installation of the window assembly in the vehicle so that window assembly can be quickly and easily mounted during the vehicle assembly process. Furthermore, since at least a portion of the drive assembly is self-contained and supported in the support rail, the drive assembly can be post-attached to the window assembly after the window assembly is installed in the vehicle, which permits retro-fitting of the drive assembly at the dealership.

In one form of the invention, a vehicular sliding window assembly includes first and second fixed window panes, which are spaced apart to define an opening therebetween. The window assembly further includes at least one guide track and at least one sliding window pane positioned in the guide track. The sliding window pane is positionable along the guide track between an open position and a closed position wherein the sliding window pane closes the opening. A support rail supports the sliding window pane whereby the weight of the sliding window pane is borne by the support rail and not by the guide track to thereby reduce the friction between the sliding window pane and the guide track.

In one aspect, the sliding window pane includes a carrier. The support rail supports the carrier thereby supporting the sliding window pane. Preferably, the carrier is attached to the sliding window pane, such as by an adhesive. In further aspects, the support rail comprises a channel-shaped support rail having spaced flanges, with the carrier supported between the spaced flanges.

In another aspect, the sliding window assembly further includes a drive assembly. The drive assembly includes a cable system, with the cable system drivingly coupled to the sliding window pane. Preferably, at least a portion of the cable system is supported in the support rail.

In further aspects, the sliding window assembly includes a second sliding window pane which is positioned in the guide track, with the first and second sliding window panes moving toward each other to close the opening and away from each other to open the opening.

In another form of the invention, a vehicular sliding window assembly includes first and second fixed window panes which are spaced apart to define an opening therebetween. The window assembly further includes upper and lower guide tracks to provide guides for the first and second sliding window panes. The sliding window panes are positionable between a closed position wherein the sliding window panes are in an abutting relationship to thereby close the opening and a plurality of open positions wherein the sliding window panes are spaced apart. A drive assembly is drivingly coupled to the sliding window panes and selectively moves the sliding window panes along the guide tracks between the open and closed positions. A support rail supports at least a portion of the drive assembly.

In one aspect, the support rail supports the first and second sliding window panes above an upwardly facing surface of the lower guide track to reduce the friction between the sliding window panes and the lower guide track. In another aspect, the support rail supports the sliding window panes below a downwardly facing surface of the upper track and above the upwardly facing surface of the lower track to reduce the friction between the sliding window panes and the upper and lower tracks which results a smooth sliding action when the sliding window panes are moved along the upper and lower tracks.

In further aspects, each sliding window pane includes a carrier, with the support rail supporting the carrier to thereby support the sliding window panes.

In other aspects, the window assembly further includes a polymeric member, which contacts at least portions of the perimeter of the fixed window panes. Preferably, the support rail is mounted to the polymeric member. In further aspects, the polymeric member includes a support mount, with the support rail mounted to the support mount. In one form, the support mount projects from the polymeric member. In another form, the support mount is fully encapsulated in the polymeric member.

According to another aspect, the drive assembly includes a cable system, with the cable system drivingly coupled to the sliding window panes. At least a portion of the cable system is supported in the support rail. In further aspects, the cable system includes at least one cable section, more preferably, a plurality of cable sections, and most preferably at least one cable guide and at least three cable sections. One of the cable sections is for drivingly coupling to a motor and cable drum assembly and to the second sliding window pane. Another cable section is drivingly coupled to the second sliding window pane and extends around the cable guide to drivingly couple to the first sliding window pane. A third section is for drivingly coupling to the motor and cable drum assembly and couples to the first sliding window pane such that when the motor and cable drum assembly pulls the first cable section, the first cable section pulls the second sliding window pane to its closed position and the second cable section pulls the first sliding window pane to its closed position. When the motor and cable drum assembly pulls the third cable section, the third cable section pulls the first sliding window pane to its open position and the second cable section pulls the second sliding window pane to its open position.

According to yet another form of the invention, a vehicular sliding window assembly includes first and second spaced apart fixed window panes and a polymeric member, which contacts and spaces the fixed window panes to define an opening therebetween. The window assembly further includes upper and lower guide tracks which are included in the polymeric member. First and second sliding window panes are slidably positioned in the upper and lower tracks and are positionable between a closed position where the sliding window panes are in an abutting relationship thereby closing the opening and a plurality of open positions where the sliding window panes are spaced apart. A support rail, which supports the sliding window panes, is supported by the polymeric member.

In one aspect, the polymeric member includes a supported mount. Preferably the support rail is supported by the support mount. In further aspects, the window assembly includes a drive assembly. The drive assembly is coupled to the sliding window panes and selectively moves the sliding window panes with respect to the support rail between at least their closed position and their open position and with at least a portion of the drive assembly supported by the support rail.

In one aspect, each of the sliding window panes includes a carrier, which is supported by the support rail. In further aspects, each of the carriers includes an elongate body having a mounting flange, which mounts to a respective sliding window pane, and a support flange which is offset from the mounting flange. The support rail supports the support flange to thereby support the sliding window panes. Preferably, the support rail comprises a channel-shaped support rail having spaced flanges, with the support flange being supported between the spaced flanges. At least one of the spaced flanges includes a retaining lip, which laterally retains the support flange in the support rail.

In another aspect, the window assembly further includes at least one seal positioned in either the upper or lower guide tracks. The seal seals the sliding window panes in the guide track. In preferred form, the window assembly includes seals in both guide tracks. For example, the seals may comprise a unitary seal having an upper portion positioned in the upper guide track and a lower portion positioned in the lower guide track and intermediate seal portions positioned between the sliding window panes and the fixed window panes thereby providing a perimeter seal around the opening.

The present invention provides a modular sliding window assembly that is preferably pre-assembled with a drive assembly thus facilitating handling and installation. In addition, the present invention provides a sliding window assembly that reduces the friction between the sliding panes and the guide tracks, resulting in reduced power requirements for the drive assembly which lowers the cost and the weight of the assembly.

These and other objects, advantages, and features will become more apparent when the following description is read in light of the drawings that follow.

BRIEF DESCRIPTIONS OF THE DRAWINGS

FIG. 1 is a front elevation view of a vehicular slide window assembly of the present invention illustrating a pair of sliding window panes in a closed position;

FIG. 1A is a similar view to FIG. 1 illustrating the sliding window panes in an open position;

FIG. 2 is a rear elevation view of the window assembly of FIG. 1;

FIG. 3 is an exploded perspective view of the slide window assembly of FIG. 1;

FIG. 3A is a cross-section taken along line IIIA—IIIA of FIG. 1;

FIG. 4A is an enlarged elevation view of the unitary seal of FIG. 4;

FIG. 4B is a cross-section taken along line IVB—IVB of FIG. 4A;

FIG. 4C is a cross-section taken along line IVC—IVC of FIG. 4A;

FIG. 4D is a cross-section taken along line IVD—IVD of FIG. 4A;

FIG. 4E is a cross-section taken along line IVE—IVE of FIG. 4A;

FIG. 4F is a cross-section taken along line IVF—IVF of FIG. 4A;

FIG. 5 is an enlarged perspective view of a window pane carrier illustrated in FIG. 3;

FIG. 5A is a cross-section view taken along line VA—VA of FIG. 5;

FIG. 9 is an enlarged exploded perspective view of the mounting arrangement of the support rail to the glass mount illustrated in FIG. 6;

FIG. 11 is an enlarged elevation view of a support rail and a cable system of the drive assembly of the window assembly in FIG. 3;

FIG. 13 is an enlarged elevation view of the drive assembly of the window assembly of FIG. 12.

DETAILED DESCRIPTION OF THE PREFERRED EMBODIMENTS

Figure 8:
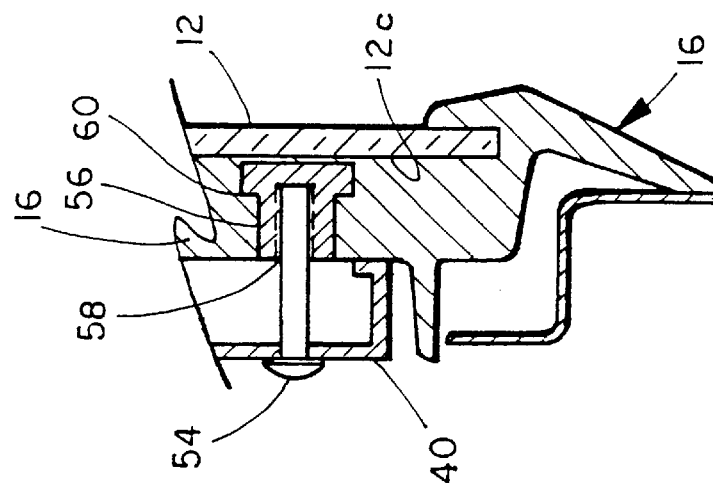
FIG. 8 is an enlarged cross-section view taken along line VIII—VIII of FIG. 2.

Referring to FIG. 1, the numeral 10 generally designates a modular sliding window assembly of the present invention. Window assembly 10 is particularly suited for mounting in a rear cab opening of a truck to provide airflow through the cab and, furthermore, to provide access to the bed of the truck. Sliding window assembly 10 is preferably a pre-assembled, self-supporting modular unit which optionally and preferably includes a pre-installed drive assembly 24 (FIG. 2) so that the window assembly can be quickly and easily installed in an assembly line process.

As shown in FIGS. 1–3, window assembly 10 includes a pair of fixed, spaced apart window panes 12 and 14 and a polymeric member 16, which contacts and spaces fixed panes 12 and 14 to define an opening therebetween. In preferred form, polymeric member 16 is secured to fixed panes 12 and 14 and, more preferably, encapsulated, such as by molding, on at least portions of the perimeters of fixed panes 12 and 14. Preferably, polymeric member 16 forms a gasket.

Panes 12 and 14 are preferably tempered or other strengthened, safety glass panels and may include a layer of black or opaque, ceramic frit layer 17 on the same surface as the gasket and fasteners that are embedded in the gasket in order to obscure the view of the remote fasteners and gasket when viewed from the opposite side of the assembly. If a layer of frit is applied to the glass panel, frit layer 17 is typically applied to a rear surface of the glass panel during the glass panel forming process, and forms the opaque or black, ceramic layer. The preferred ceramic paint is manufactured by Drakenfeld Color, Inc. of Washington; Pa. The paint includes small ceramic particles and suitable metal oxide pigment suspended in oil of a type conventionally known in the art applied to the glass surface and fired to fuse the paint to the glass. Polymeric member 16 comprises a polymeric material, such as polyvinyl chloride (PVC), thermoplastic rubber, thermoplastic urethane, reaction injection molded urethane, or the like, and is preferably attached, such as by molding, onto the fixed window panes with one or more fasteners (not shown) embedded in the gasket to mount the window assembly to a vehicle.

Positioned over the opening 18 defined between fixed window panes 12 and 14 is at least one sliding pane and, more preferably, a pair of sliding window panes 20 and 22 which are movable in a horizontal direction between a closed position (shown in FIGS. 1 and 2) and one or more open positions (shown in FIG. 1A) and, further, are preferably aligned in a common plane offset from fixed window panes 12 and 14. As used herein, the term "horizontal" refers to an orientation when the window assembly is mounted in the vehicle and means transverse to the longitudinal centerline of the vehicle. It should be understood, however, that this invention may also be used in a vertical arrangement, with "vertical" referring to the direction upward or downward from the longitudinal centerline of the vehicle. Window panes 20, 22 are similarly preferably strengthened, safety glass panels. As will be more fully described below, sliding window panes 20 and 22 are moved between their respective open and closed positions by drive assembly 24 which positively retains the position of the respective sliding window panes 20, 22 so that the window panes 20, 22 may not be opened unless the drive assembly is actuated to prevent unauthorized access into the vehicle. Furthermore, sliding panes 20 and 22 are supported in a manner such that panes 20 and 22 move between their closed and open positions with minimal friction to create a smooth sliding action, which minimizes the power requirements of drive assembly 24 and hence the weight and cost of the assembly.

In preferred form, polymeric member 16 forms a three-sided perimeter gasket with upper and lower portions 16a and 16b, which are molded on the upper and lower perimeter edges of fixed window panes 12 and 14. Polymeric member 16 spans between fixed window panes 12 and 14 and includes side portions 16c and 16d, which are molded on the respective side perimeter edges of panes 12 and 14, to form with fixed panes 12 and 14, and with sliding panes 20, 22, a self-supporting modular unit that can be easily handled during shipping and installation. In addition, polymeric member 16 preferably includes intermediate portions 16e and 16f which are encapsulated on the inner edges of the respective fixed window panes to form part of the seal system that seals opening 18, as will be described in greater detail below.

Provided in polymeric member 16 is at least one guide track and, more preferably, a pair of upper and lower guide tracks 26 and 28 (FIG. 2). In preferred form, tracks 26 and 28 are molded in polymeric member 16. As best understood from FIGS. 2 and 4, tracks 26 and 28 are provided in polymeric member 16 behind fixed panes 12 and 14 in upper and lower portions 16a and 16b of polymeric member 16. Each track 26, 28 comprises an elongate channel-shaped member and, preferably, a metal member, such as extruded aluminum member, with a first channel-shaped portion 26a, 28a and a second channel-shaped portion 26b, 28b, respectively. In order to ease assembly of sliding window panes 20, 22 in tracks 26, 28, upper track 26 preferably includes a removable flange portion 26c (FIG. 2) which is secured by fasteners so that panes 20 and 22 can be properly aligned in between tracks 26 and 28 with minimal vertical play.

Positioned in one or more tracks 26, 28 is a seal 30 which seals panes 20 and 22 in the respective track 26, 28. Seal 30 is preferably formed from an EPDM rubber or SANTAPRENE or the like. Preferably, each track 26, 28 includes a seal, with the seal optionally provided by a unitary H-shaped seal 32 (FIG. 4A) which includes upper and lower seal sections or portions 32a and 32b and a pair of interconnecting seal sections 32c and 32d. Upper seal section 32a is positioned in upper rail 26 for sealing the upper edges 20a and 22a of sliding panes 20 and 22, respectively. Lower seal section 32b is positioned in lower guide track 28 for sealing against lower edges 20b and 22b of sliding panes 20 and 22, respectively. As best seen in FIGS. 4A and 4B, lower seal section 32b includes a generally channel-shaped body 52 which generally follows the contour of upper or first channel-shaped portion 28a of lower track 28. In addition, between interconnecting seal sections 32c and 32d, lower seal section 32b includes an inwardly, downwardly extending or folded lip 52a, which seals against an inner surface of the respective sliding window pane 20, 22, and an inwardly and upwardly extending lip 52b, which seals against an outer surface of the respective sliding window pane 20, 22. As best seen in FIG. 4C, the ends of seal portion 32b which extend beyond interconnecting seal portions 32c and 32d may omit the upwardly extending lip portion (52b).

Referring to FIG. 4D, upper seal section 32a includes a downwardly facing channel-shaped body 53 with an upwardly and inwardly extending or folded lip 53a, which seals against the inner surface of the respective sliding window pane 20, 22, and an inwardly and downwardly extending lip 53b, which seals against the outer surface of the respective sliding window pane 20, 22. The channel-shaped cross-section of body 53 generally follows the contour of lower or first channel-shaped section 26a of upper track 26. In addition, upper seal section 32a includes an upwardly extending retaining flange 53c which includes a plurality of flexible ribs 53d that compress to frictionally engage second channel-shaped section 26b to hold seal section 32a in upper track 26. As best seen in FIG. 4E, the end portions of upper seal section 32a that extend beyond interconnecting seal sections 32c and 32d may similarly omit the inwardly and downwardly extending lip (53b).

Figure 4:
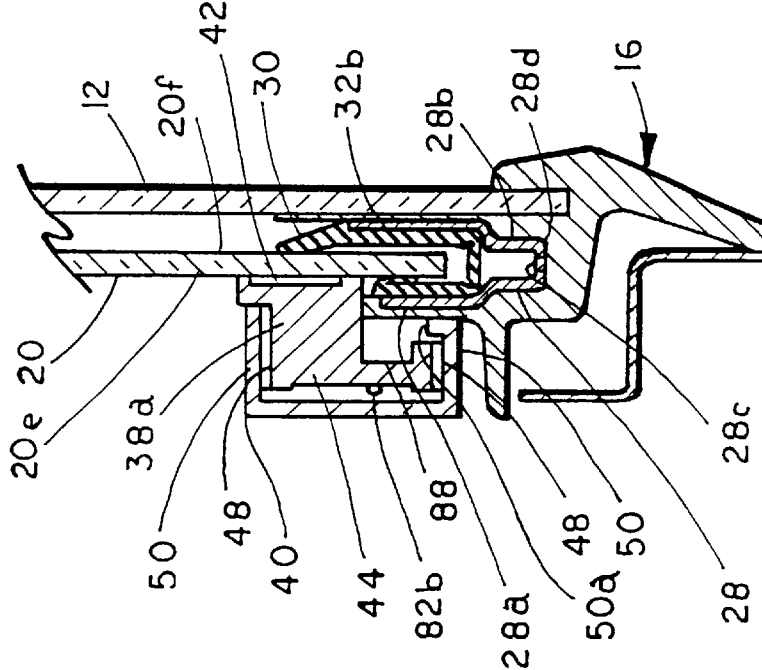
FIG. 4 is an enlarged cross-section view taken along line IV—IV of FIG. 2.
Figure 6:
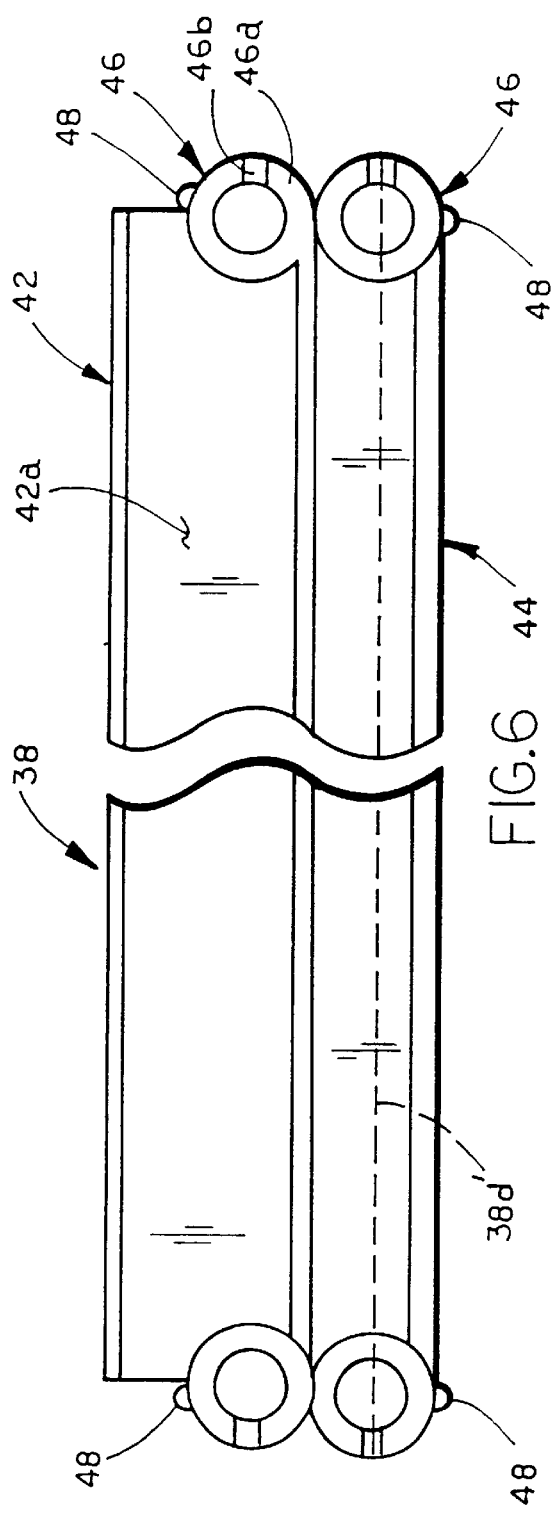
FIG. 6 is an elevation view of the carrier of FIG. 5.
Figure 7:
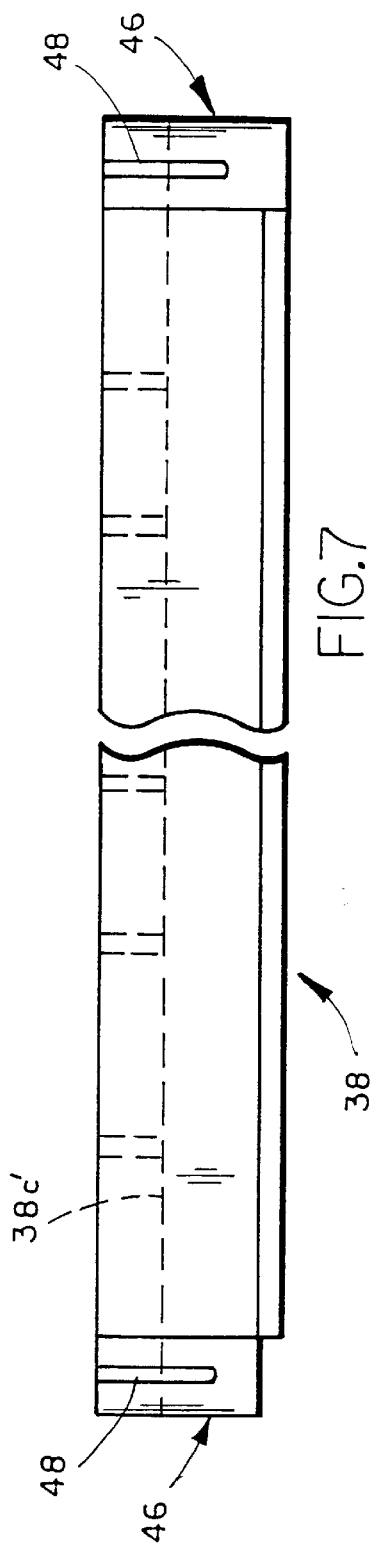
FIG. 7 is a top plan view of the carrier of FIG. 6.

Preferably, interconnecting seal sections 32c and 32d are aligned with gasket intermediate portions 16e and 16f and are sandwiched between sliding panels 20 and 22 and rear surface 16e′ and 16f′ of interconnecting gasket portions 16e and 16f, respectively. Seal portions 32c each includes a generally V-shaped cross-section with a base 33a and a pair of angled flanges 33b, 33c that seal against the outer surfaces of window panels 20, 22 and which together with lips 53b and 52b form a perimeter seal around opening 18. In this manner, when sliding window panes 20 and 22 move between their open and closed positions, seal sections 32a, 32b, 32c, and 32d and seals 34 and 36 essentially completely seal opening 18. In preferred form, lower section 32b of seal 32 includes a plurality of apertures 52c (FIG. 4C) which extend through web portion 52d of channel-shaped body 52 to permit drainage of water, which may collect between sliding window panes 20, 22 and lower section 32b of seal 32. In addition, support track 28 preferably includes a plurality of openings 28d in channel portion 28b to permit drainage of the water from the track (FIG. 4).

In addition, mounted to inner edges 20c and 22c of sliding panels 20 and 22, respectively, are seals 34 and 36 (FIG. 3A), which complete the seal of opening 18 when sliding panels 20 and 22 are moved to their closed position. As best seen in FIGS. 1, 3A, and 3B, seal 34 comprises an elongated member with a groove 34a for receiving edge of panel 20 and a projecting rib 34b. Seal 36 similarly comprises an elongated member with a groove 36a for receiving edge 22c of panel 22 and a second recessed portion or groove 36b for receiving projecting rib 34b of seal 34. Preferably, seals 34 and 36 are extruded aluminum elongated members. Positioned in groove 36b is an elastomeric member 36c, which is secured in groove 36b, for example by an adhesive or the like. Thus, when panels 20, 22 are moved to their closed position, rib 34b extends into groove 36b and compresses against elastomeric member 36c to seal opening 18.

Seal 30 may be formed from a co-extrusion where, for example, retaining flange 53c and/or base 33a are formed from a plastic, such as a polypropylene or the like, and with lips 52a, 52b, 53a, 53b, and/or flanges 33b and 33c formed from a more flexible material, such as EPDM rubber or SANTAPRENE or the like. In this manner, the seal or seal portions form a snap fit connection with their respective parts. In addition, optionally, the seal or seal portions may be slip coated in order to reduce friction between the sliding panes and the seal or seal portions.

In order to provide a smooth sliding action for sliding window panes 20 and 22, panes 20 and 22 are preferably supported or suspended above an upwardly facing surface or bottom surface 28c of track 28 (FIG. 4) and, more preferably, between upper and lower guide tracks 26 and 28 so that panes 20, 22 are spaced below a downwardly facing surface or upper surface of track 28 and above bottom surface 28c to reduce the friction between the respective sliding panes 20, 22 and tracks 26 and 28. In this manner, tracks 26 and 28 preferably merely provide a guide for panes 20, 22. As best understood from FIGS. 3 and 5, panes 20, 22 include carriers 38a, 38b mounted to a lower portion of pane 20, 22. Carriers 38a and 38b are supported by a support rail 40 (FIG. 4) which supports panes 20 and 22 between tracks 26 and 28 to thereby reduce the friction between panes 20 and 22 and seal portions 32a and 32b and tracks 26 and 28. In this manner, the weight of sliding panes 20 and 22 is not borne by lower track 28 and, instead, is borne by support rail 40. In preferred form, carriers 38a and 38b are mounted to the rear surfaces of sliding panes 20, 22 by an adhesive, such as epoxy, acrylic, acrylate, urethane, or silicone. Alternately, or in addition, carriers 38a and 38b may be secured by panes 20, 22 by fasteners which extend through holes drilled through panes 20, 22. In addition, carrier members 38 preferably comprise a plastic material, such as a polyolefin and, more preferably, a reinforced polyolefin, such as glass filled nylon. Alternately, carriers 38a and 38b may comprise metal carriers, such as stamped metal carriers, including steel, with an optional coating to reduce friction, such as E-coating.

Referring to FIGS. 8 and 9, support rail 40 is preferably mounted to polymeric member 16 by fasteners 54 which engage support mounts 56, which are molded in polymeric member 16 and, more preferably, molded in lower portion 16b of polymeric member 16. In the illustrated embodiment, support mounts 56 are recessed or fully encapsulated within lower portion 16b of polymeric member 16 and may be formed from plastic or a metal material, such as steel or brass. As best seen in FIG. 9, each mount 56 includes a base 60 and a projecting boss 62 which includes a passage 58, preferably a threaded passage, formed therein for receiving fasteners 54. Fasteners 54 may be screws, including self-threading screws, or plastic fasteners, in the case where support mounts 56 comprise plastic mounts. In the illustrated embodiment, boss 62 has a generally cross-shaped cross section which provides increased surface area between polymeric member 16 and boss 62 to provide increased retention of support mount 56 in polymeric member 16 and increased resistance to torsional forces which are applied when fasteners 54 are threaded into opening 58. Optionally, base 60 may include a plurality of openings 64 to permit the polymeric material to flow through the base and, preferably, behind base 60 and onto the rear surfaces of fixed panes 12 and 14. In this manner, the retention of support mount 56 relies on the bonding between the polymeric member and the fixed glass panes. Optionally, base 60 may include a plurality of projections 60b, which offset base 60 from the glass pane to permit enhanced flow of the polymeric material behind base 60. Alternatively, an adhesive may be applied to rear surface 60a of base 60 so that support mount 56 is directly adhered to the glass pane with polymeric member 16 providing enhanced retention of mount 56 on the respective pane.

As best seen in FIGS. 5, 5A, and 6–7, each carrier 38a and 38b comprises an elongate member with a first flange portion 42, which forms a mounting flange for mounting carrier 38a and 38b onto a respective sliding pane 20 or 22. As noted previously, carriers 38 are preferably a plastic material, such as a polyolefin and, more preferably, a reinforced polyolefin, such as glass filled nylon. Preferably, flange portion 42 includes a recessed surface 42a for receiving adhesive to mount carriers 38a, 38b onto sliding panes 20, 22. Extending rearwardly and downwardly (as viewed in FIG. 4) from flange portion 42 is a support flange 44 which includes at opposed ends engagement members 46 for coupling to the drive system, as will be more fully described below, and which is supported between upper and lower flanges 50 and 52 of support rail. Again referring to FIG. 5, support flange 44 preferably includes a webbed portion 54 to reduce the weight of carrier 38a, 38b while providing sufficient stiffness to support and guide panels 20 and 22 along support rail 40. In the illustrated embodiment, engagement members 46 include cylindrical walls 46a with slotted recesses 46b. Cylindrical walls 46a are sized to receive and engage cable couplers, with recesses 46b sized to permit the cable secured to the cable coupler to extend through cylindrical wall but to retain the cable coupler in the cylindrical wall. Further details of suitable cable and cable couplers will be described in reference to drive assembly 24. Formed on engagement members 46 are a plurality of ribs 48 which provide bearing surfaces for carrier 38a and 38b and which guide carriers 38a and 38b along support rail 40.

As best seen in FIG. 4, ribs 48 support carriers 38a, 38b between upper and lower flanges 50 and 52 of support rail 40 whereby the weight of the sliding pane 20, 22 is distributed by carrier 38a and 38b to rail 40 while permitting panels 20, 22 to slide along support rail 40 under the power of drive assembly 24. In order to provide lateral restraint to sliding window panes 20 and 22 in support rail 40, support rail 40 preferably includes a stop, such as an upwardly extending lip 50a on lower flange 50 (FIGS. 4 and 9). Lip 50a limits lateral movement of support flange 44 across rail 40. In addition to providing vertical support to the respective sliding pane, therefore, support rail 40 provides lateral restraint of the sliding window panes, which enhances the retention of the pane in assembly 10 and reduces the risk of unauthorized access through opening 18 into the cab of the vehicle. As will be more fully described in reference to drive assembly 24, sliding panes 20, 22 are positively held in their positions along upper and lower tracks 26 and 28 by back drive retention to provide an anti-theft system.

Referring to FIG. 11, drive assembly 24 includes a cable system 82 which couples to a motor and cable drum assembly 80 and carriers 38a and 38b of sliding window panes 20 and 22, respectively. Cable system 82 includes at least one cable section, more preferably, a plurality or cable sections, and, most preferably, three cable sections 82a, 82b, and 82c. First cable section 82a is coupled on one end to a cable drum 80a of motor and cable drum assembly 80 and preferably extends from cable drum 80a through a non-rigid cable conduit 84 to couple at its other end to carrier 38b of sliding window pane 22 by a cable coupler 85 which engages cable mount 46 of carrier 38b. Cable couplers 85 comprise cylindrical or spherical bodies (FIG. 5), such as plastic or metal bodies, that are fixed, such as by welding, adhesive, or by fasteners, to the end of the respective cable sections. The cylindrical or spherical bodies of the cable couplers are sized to insert into the cable mount with minimal play and, more preferably, with a friction fit between the coupler and the cable mount so that the cable system 82 can maintain the position of the respective sliding window panes with minimal play. Since carriers 38a and 38b are preferably mounted to the respective sliding window panes 20, 22 generally at the same elevation, first cable section 82a preferably extends over carrier 38a of sliding window pane 20 to minimize the cable deflections. Optionally, carrier 38 may be formed with an elongate groove or recess 38c (shown in phantom) formed therein, for example by cutting along the phantom line designated 38c' (FIGS. 5, 5A, and 6) in order to provide a cable guide along the outer surface of carrier 38. In this manner, cable section 82a can extend linearly through rail 40 thus maintaining the cable in tension only and minimize any bending stress on the cable (see FIG. 4).

Second cable section 82b is coupled to guide 38a of sliding window pane 22 by a cable coupler 85 which engages cable mount 46 on one end and extends around a cable guide 88, which is mounted to support rail 40, to couple to guide 38b on sliding window panel 20. Preferably, second cable section 82b similarly extends over cable guide 38a of window pane 20. Cable guide 38a optionally includes an elongate recess or groove 38d, similarly formed such as by cutting along phantom lines 38d' (FIGS. 5, 5A, and 7), in order to form a cable guide so that cable sections 82a, 82b, 82c can be maintained in their linear configuration.

Third cable section 82c is coupled on one end by a coupler 85 to a cable mount 46 of guide 38b and coupled to cable drum 80a at its second end. Preferably, cable section 82c extends to cable drum 80a through a flexible cable conduit 90 similar to first cable section 82a. As can be appreciated from FIG. 11, cable system 82 enters and exits from one end of support rail 40 which minimizes the number of cable guides and, therefore, the weight of the assembly. In addition, motor and cable drum assembly 80 may be located essentially anywhere in the vehicle.

In operation, when motor and cable drum assembly 80 is energized to pull on first cable section 82a, sliding window pane 22 moves to its closed position, which in turn pulls on cable section 82b. Cable section 82b then pulls on sliding window pane 20 causing it to move to its closed position. On the other hand, when motor and cable drum assembly 80 pulls on cable section 82c, window pane 20 is moved to its open position, causing cable section 82b to pull on sliding window pane 22 to move to its open position. In order to keep first and third cable sections 82a and 82c separated as they enter and exit rail 40, support rail 40 preferably includes a second cable guide 92 and, furthermore, preferably includes a cable conduit terminal 94 (FIG. 11) in which both cable conduits 84 and 90 terminate. In this manner, at least a portion the cable system of drive assembly 24 can be incorporated into window assembly 10 either during the assembly process or during a post assembly process, such as at a dealership.

Figure 10:
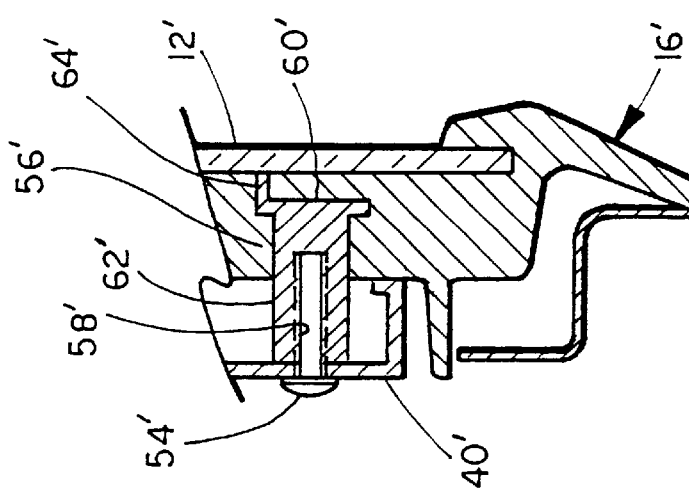
FIG. 10 is a similar view to FIG. 8 illustrating a second embodiment of the mounting arrangement of the support rail.

Referring to FIG. 10, a second embodiment of a support mount 56' is illustrated. In this embodiment, support mount 56' is only partially molded in polymeric member 16' and projects outwardly from polymeric member 16'. As best seen in FIG. 10, support mount 56' includes a base 60' and a projecting boss 62' which projects outwardly from polymeric member 16'. Base 60' is spaced from fixed window pane 12' by a rearward projection 64' and is fully molded or encapsulated in polymeric member 16'. Boss 62' includes a threaded passage 58' for receiving a fastener 54' similar to the previous embodiment. Though illustrated with support rail 40' bearing on polymeric member 16', it can be appreciated by providing a projecting boss 62', that support rail 40' may be spaced from polymeric member 16' with the weight of support rail 40' and the enclosed driver assembly (not shown) distributed to support mount 56' through mounting boss 62'.

Figure 12:
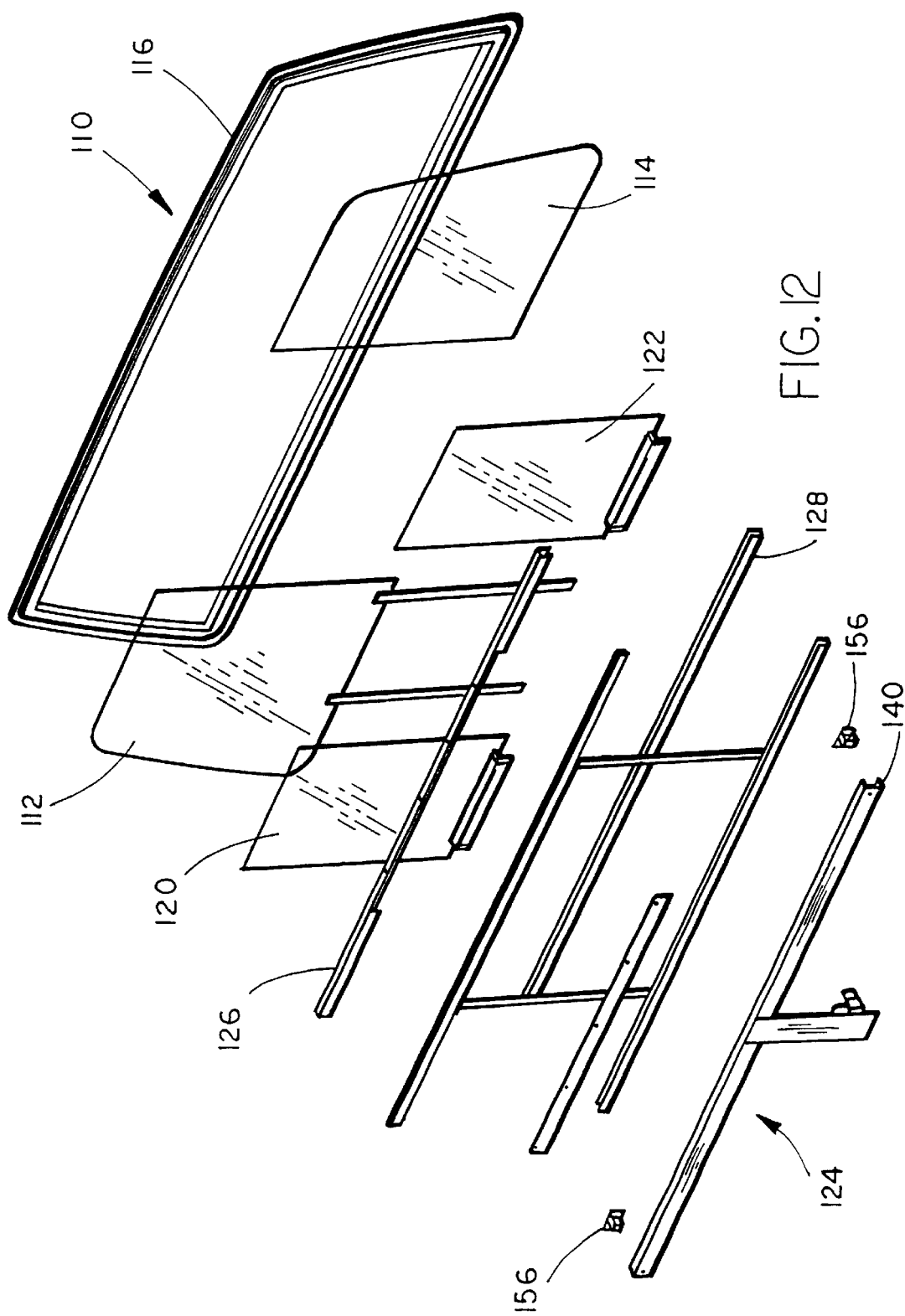
FIG. 12 is an exploded perspective view of another embodiment of the slide window assembly of the present invention.

Referring to FIGS. 12 and 13, a second embodiment 110 of the window assembly of the present invention is illustrated. Window assembly 110 is of similar construction to assembly 10 and includes a pair of fixed spaced apart window panes 112 and 114, which define an opening 118 therebetween, and a pair of sliding window panes 120 and 122 which open and close opening 118. A polymeric member 116 is molded on perimeter portions of fixed window panes 112 and 114 and forms a perimeter gasket around perimeter portions of fixed window panes 112 and 114 and, further, includes support mounts 156 molded therein for supporting support rail 140. Provided, such as by molding, in polymeric member 116 are upper and lower guide tracks 126 and 128, similar to the previous embodiment, which guide sliding window panes 120, 122 between open and closed positions. Reference is made to the first embodiment for further details of tracks 126 and 128, seals, and the like.

Sliding window panes 120 and 122 are slidably positioned in tracks 126 and 128 and are driven between a closed position such as illustrated in FIG. 1 and one or more open positions such as illustrated in FIG. 1A similar to the previous embodiment by a drive assembly 124. Drive assembly 124 is mounted to support rail 140 so that window assembly 110 provides a fully pre-assembled modular window assembly. Referring to FIG. 13, drive assembly 124 includes a cable system 182 which couples to a motor and cable drum assembly 180. In the illustrated embodiment, motor and cable drum assembly 180 is mounted to support rail 140 by a mounting plate 184. Cable system 182 enters support rail 140 through a side portion and, preferably, through a medial side portion of rail 140. In order to guide the cable system, support rail 140 includes four cable guides 188, 192, 194, and 196. Cable system 182 includes a first cable section 182a which is coupled on one end to cable drum 180a and coupled at its other end to guide 138a of sliding window panel 120. Cable assembly 182 includes a second cable section 182b which is coupled on one end to an opposed end of carrier 138a and extends over carrier 138b and around a cable guide 192 to couple at its other end to guide 138b which is mounted to sliding window panel 122. A third cable section 182c is coupled on one end to the opposed end of guide 138b and extends around cable guide 196 and exits rail 140 to couple to cable drum 180a on its opposed end. In this manner, when cable drum 180a pulls on section 182a, sliding window pane 120 moves to its open position causing cable section 182b to pull sliding window pane 122 to move it to its open position. On the other hand, when cable drum 180a pulls on third cable section 182c, third section 182c pulls on sliding window pane 122 to move it to its closed position, which in turn causes second cable section 182b to pull on sliding window pane 120 to move it to its closed position.

While several forms of the invention have been shown and described, other forms will now be apparent to those skilled in the art. For example, carriers 38 may comprise solid elongate members or may have elongate transverse passages formed therein to provide cable guides so that the cables can be maintained in a linear path. The shape of support mounts 56 may be varied to achieve the same or similar function. Furthermore, the number of support mounts may be increased or decreased. In addition, the window assembly may include a single fixed window pane and/or a single sliding window pane and, further, may comprise a manually operated window assembly.

Therefore, it will be understood that the various embodiments shown in the drawings and described above are merely for illustrative purposes, and are not intended to limit the scope of the invention which is defined by the claims which follow as interpreted under the principles of patent law including the doctrine of equivalents.

I claim:

1. A vehicular sliding window assembly comprising:
    first and second fixed window panes having perimeter portions and being spaced apart to define an opening therebetween;
    at least one guide track;
    at least one sliding window pane positioned in said guide track and positionable between a closed position and a plurality of open positions, said guide track guiding said sliding window pane, and said sliding window pane closing said opening when in said closed position;
    a support rail supporting said sliding window pane whereby the weight of said sliding window pane is borne by said support rail and not by said guide track; and
    a polymeric member, said first and second fixed window panes contacting said polymeric member and being spaced apart by said polymeric member wherein said polymeric member includes at least one support mount included therein, said support rail being supported by said support mount.

2. The vehicular sliding window assembly according to claim 1, wherein said sliding window pane includes a carrier, said support rail supporting said carrier to thereby support said sliding window pane.

3. The vehicular sliding window assembly according to claim 2, wherein said carrier is attached to said sliding window pane by one of an adhesive and a mechanical fastener.

4. The vehicular sliding window assembly according to claim 2, wherein said support rail comprises a channel-shaped support rail having spaced flanges, said carrier supported between said spaced flanges.

5. The vehicular sliding window assembly according to claim 2, wherein said carrier comprises one of a plastic carrier and a metal carrier.

6. The vehicular sliding window assembly according to claim 1, wherein said sliding window pane comprises a first sliding window pane, said window assembly further comprising a second sliding window pane positioned in said guide track, said first and second sliding window panes moving toward each other to close said opening and away from each other to open said opening.

7. The vehicular sliding window assembly according to claim 1, further comprising a seal positioned in said guide track, said seal sealing said sliding window pane in said guide track.

8. The vehicular sliding window assembly according to claim 1, wherein said support rail is mounted to said support mount.

9. The vehicular sliding window assembly according to claim 8, wherein said support rail rests on said support mount.

10. The vehicular sliding window assembly according to claim 1, wherein said support mount projects from said polymeric member.

11. The vehicular sliding window assembly according to claim 1, wherein said support mount is recessed in said polymeric member.

12. The vehicular sliding window assembly according to claim 1, further comprising a cable system, said cable system drivingly coupled to said sliding window pane.

13. The vehicular sliding window assembly according to claim 12, wherein at least a portion of said cable system is supported in said support rail.

14. The vehicular sliding window assembly according to claim 1, wherein said polymeric member forms a gasket.

15. The vehicular sliding window assembly according to claim 1, wherein said polymeric member is encapsulated onto said first and second fixed window panes.

16. A vehicular sliding window assembly comprising:
    first and second spaced apart fixed window panes, said first and second fixed window panes defining an opening therebetween;

upper and lower guide tracks;

first and second sliding window panes positioned in said upper and lower tracks and positionable between a closed position wherein said first and second sliding window panes are in an abutting relationship thereby closing said opening and a plurality of open positions wherein said sliding window panes are spaced apart;

a drive assembly drivingly coupled to said sliding window panes and selectively moving said sliding panes along said upper and lower guide tracks between said open and closed positions;

a support rail supporting at least a portion of said drive assembly; and a support mount included in a polymeric member, said support rail mounted to said support mount, wherein said support rail rests on said support mount.

17. The vehicular sliding window assembly according to claim 16, wherein said support mount projects from said polymeric member.

18. The vehicular sliding window assembly according to claim 16, wherein said support mount is recessed in said polymeric member.

19. The vehicular sliding window assembly according to claim 16, wherein said lower guide track includes an upwardly facing surface facing said first and second sliding window panes, said support rail supporting said first and second sliding window panes above said upwardly facing surface of said lower guide track whereby the weight of said sliding window panes is borne by said support rail and not said lower guide track to reduce the friction between said lower guide track and said sliding window panes to provide a smooth sliding action when said sliding window panes are moved along said lower guide track.

20. The vehicular sliding window assembly according to claim 19, wherein said upper guide track has a downwardly facing surface facing said first and second sliding window panes, said support rail supports said first and second sliding window panes below said downwardly facing surface of said upper guide track to reduce the friction between said sliding window panes and said upper and lower guide tracks.

21. The vehicular sliding window assembly according to claim 16, further comprising at least one seal positioned in at least one of said upper and lower guide tracks and sealing said sliding window panes in said at least one of said upper and lower guide tracks.

22. The vehicular sliding window assembly according to claim 16, wherein each of said sliding window panes includes a carrier, said support rail supporting said carriers to thereby support said sliding window panes.

23. The vehicular sliding window assembly according to claim 22, wherein said carriers are attached to said sliding window panes by at least one of an adhesive and a mechanical fastener.

24. The vehicular sliding window assembly according to claim 22, wherein said support rail comprises a channel-shaped support rail having spaced flanges, said carriers supported between said spaced flanges.

25. The vehicular sliding window assembly according to claim 23, wherein each of said carriers comprise one of a plastic carrier and a metal carrier.

26. The vehicular sliding window assembly according to claim 16, further comprising a polymeric member contacting at least a portion of the perimeters of said first and second fixed window panes.

27. The vehicular sliding window assembly according to claim 16, wherein said support rail is mounted to said polymeric member.

28. The vehicular sliding window assembly according to claim 16, wherein said support mount is molded in said polymeric member.

29. The vehicular sliding window assembly according to claim 16, wherein said drive assembly includes a cable system, said cable system drivingly coupled to said sliding window panes.

30. The vehicular sliding window assembly according to claim 29, wherein at least a portion of said cable system is supported in said support rail.

31. The vehicular sliding window assembly according to claim 29, wherein said cable system includes at least one cable section coupled to said first and second sliding window panes.

32. The vehicular sliding window assembly according to claim 31, wherein said cable system includes a plurality of cable sections.

33. The vehicular sliding window assembly according to claim 32, wherein said cable system includes at least one cable guide and at least three cable sections, a first cable section of said three cable sections being adapted to drivingly couple to a motor and cable drum assembly and being drivingly coupled to said second sliding window pane, a second cable section of said three cable sections being drivingly coupled to said second sliding window pane and extending around said cable guide to drivingly couple to said first sliding window pane, a third cable section of said three cable sections being adapted to drivingly couple to the motor and cable drum assembly and being drivingly coupled to said first sliding window pane such that when said first cable section is pulled by the motor and cable drum assembly, said first cable section pulls said second sliding window pane to said closed position and said second cable section pulls said first sliding window pane to said closed position and when the motor and cable drum assembly pulls said third cable section, said third cable section pulls said first sliding window pane to said open position and said second cable section pulls said second sliding window pane to said open position.

34. A vehicular sliding window assembly comprising:

first and second spaced apart fixed window panes;

a polymeric member contacting said first and second fixed window panes and spacing said first and second spaced apart fixed window panes to define an opening therebetween;

upper and lower guide tracks included in said polymeric member;

first and second sliding window panes slidably positioned in said upper and lower tracks and positionable between a closed position wherein said first and second sliding window panes are in an abutting relationship thereby closing said opening and a plurality of open positions wherein said first and second sliding window panes are spaced apart; and a support rail supported by said polymeric member, said support rail supporting said first and second sliding window panes wherein said polymeric member includes at least one support mount, said support rail supported by said support mount.

35. The vehicular sliding window assembly according to claim 34, further comprising a drive assembly coupled to said first and second sliding window panes, said drive assembly selectively moving said sliding window panes with respect to said support rail and upper and lower guide tracks between at least said closed position and said open positions.

36. The vehicular sliding window assembly according to claim 35, wherein at least part of said drive assembly is supported by said support rail.

37. The vehicular sliding window assembly according to claim 36, wherein said drive assembly includes a cable system.

38. The vehicular sliding window assembly according to claim 37, wherein at least a portion of said cable system is supported in said support rail.

39. The vehicular sliding window assembly according to claim 38, wherein said cable system includes at least one cable section coupled to said first and second sliding window panes.

40. The vehicular sliding window assembly according to claim 39, wherein said cable system includes a plurality of cable sections.

41. The vehicular sliding window assembly according to claim 40, wherein at least one of said cable sections is supported in said support rail.

42. The vehicular sliding window assembly according to claim 40, wherein said cable system includes at least one cable guide and at least three cable sections, a first cable section of said three cable sections for drivingly coupling at one end to a motor and cable drum assembly and being driving coupled to said second sliding window pane at the other end of said first cable section, a second cable section of said three cable sections being drivingly coupled to said second sliding window pane at one end of said second cable section and extending around said cable guide to drivingly couple to said first sliding window pane at the other end of said second cable section, a third cable section of said three cable sections for drivingly coupling to the motor and cable drum assembly at one end and being drivingly coupled to said first sliding window pane at the other end of said third cable section such that when the motor and cable drum assembly pulls said first cable section, said first cable section pulls said second sliding window pane to said closed position and said second cable section pulls said first sliding window pane to said closed position and when the motor and cable drum assembly pulls said third cable section, said third cable section pulls said first sliding window pane to one of said open positions and said second cable section pulls said second sliding window pane to one of said open positions.

43. The vehicular sliding window assembly according to claim 42, wherein each of said sliding window panes includes a carrier, said support rail supporting said carriers and thereby supporting said sliding window panes.

44. The vehicular sliding window assembly according to claim 43, wherein said first cable section is coupled to one end of said carrier of said second sliding window pane to thereby couple to said second sliding window pane.

45. The vehicular sliding window assembly according to claim 44, wherein said second cable section is coupled to the other end of said carrier of said second sliding window and to one end of said carrier of said first sliding window pane to thereby couple to said second and first sliding window panes.

46. The vehicular sliding window assembly according to claim 45, wherein said third cable section is coupled to the other end of said carrier of said first sliding window pane to thereby couple to said first sliding window pane.

47. The vehicular sliding window assembly according to claim 46, wherein said first cable section extends over a portion of said carrier of first sliding window pane and said second cable section extends over a portion of said carrier of said second sliding window pane to maintain a linear orientation of said first and second cable sections.

48. The vehicular sliding window assembly according to claim 43, wherein said support rail comprises a channel shaped rail having spaced flanges, said carriers being supported between said spaced flanges.

49. The vehicular sliding window assembly according to claim 43, wherein said upper guide track includes a downwardly facing surface facing said first and second sliding window panes, said lower guide track having an upwardly facing surface facing said first and second sliding window panes, said support rail supporting said sliding window panes between said lower and upper tracks wherein said sliding window panes are spaced above said upwardly facing surface of said lower track and spaced below said downwardly facing surface of said upper track whereby the weight of said first and second sliding window panes is borne by said support rail and not borne by said guide tracks to reduce the friction between said sliding window panes and said guide tracks and thereby reduce the power requirements of the motor and cable drum assembly.

50. The vehicular sliding window assembly according to claim 34, further comprising at least one seal positioned in at least one of said upper and lower guide tracks, said seal sealing first and second sliding window panes in said at least one of said upper and lower guide tracks.

51. The vehicular sliding window assembly according to claim 50, further comprising a second seal positioned in the other of said upper and lower guide tracks.

52. The vehicular sliding window assembly according to claim 51, wherein said seals comprise a unitary seal having an upper portion positioned in said upper guide track and a lower portion positioned in said lower guide track and intermediate seal portions positioned between said sliding window panes and said fixed window panes thereby providing a perimeter seal around said opening.

53. The vehicular sliding window assembly according to claim 34, wherein each of said sliding window panes includes a carrier, said support rail supporting said carriers to thereby support said sliding window panes.

54. The vehicular sliding window assembly according to claim 53, wherein each of said carriers includes an elongate body having a mounting flange mounted to a respective sliding window pane and a support flange offset from said mounting flange, said support rail supporting said support flange to thereby support said sliding window panes.

55. The vehicular sliding window assembly according to claim 54, wherein said support rail includes a retaining lip, said retaining lip laterally retaining said support flange in said support rail.

56. The vehicular sliding window assembly according to claim 53, wherein said carriers are attached to said sliding window panes by an adhesive.

57. The vehicular sliding window assembly according to claim 53, wherein said support rail comprises a channel-shaped support rail having spaced flanges, said carriers supported between said spaced flanges.

58. The vehicular sliding window assembly according to claim 53, wherein said carriers comprise plastic carriers.

* * * * *